United States Patent
Berkovitz et al.

(10) Patent No.: US 11,661,848 B2
(45) Date of Patent: May 30, 2023

(54) FOUR PISTON SCOTCH YOKE ACTUATOR

(71) Applicant: Habonim Industrial Valves & Actuators Ltd., Galil Elion (IL)

(72) Inventors: Igor Berkovitz, Karmiel (IL); Yoel Hadar, Kiryat Shmona (IL)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 17/460,224

(22) Filed: Aug. 29, 2021

(65) Prior Publication Data
US 2023/0063294 A1    Mar. 2, 2023

(51) Int. Cl.
*F02B 9/02* (2006.01)
*F01B 9/02* (2006.01)
*F15B 15/06* (2006.01)

(52) U.S. Cl.
CPC ............ *F01B 9/023* (2013.01); *F15B 15/066* (2013.01)

(58) Field of Classification Search
CPC ......... F15B 15/066; F15B 15/06; F01B 9/023
See application file for complete search history.

(56) References Cited

U.S. PATENT DOCUMENTS

| | | | | |
|---|---|---|---|---|
| 599,487 A * | 2/1898 | Bailey | ...................... | F04B 1/053 92/144 |
| 3,887,301 A * | 6/1975 | Henkel | ................... | B23P 11/02 92/172 |
| 3,924,968 A * | 12/1975 | Gaines | ................ | F04B 27/0428 92/172 |
| 5,653,876 A * | 8/1997 | Funke | ..................... | F04B 23/06 417/532 |
| 8,087,316 B2 * | 1/2012 | Holtgraver | .......... | F16K 31/1635 74/50 |
| 2005/0092171 A1 * | 5/2005 | Shu | ...................... | F16K 31/1635 92/72 |
| 2009/0199811 A1 * | 8/2009 | Fisher | ..................... | F04B 27/02 123/197.4 |
| 2011/0200473 A1 * | 8/2011 | Pekrul | ................. | F01C 21/0863 418/145 |

(Continued)

FOREIGN PATENT DOCUMENTS

| | | | | |
|---|---|---|---|---|
| CN | 101501338 A | * | 8/2009 | ............ F04B 1/0404 |
| DE | 8536444 | | 2/1987 | |

(Continued)

OTHER PUBLICATIONS

PCT Search Report and Written Opinion PCT/IB2022/057829, dated Nov. 25, 2022.

*Primary Examiner* — George C Jin
*Assistant Examiner* — Teuta B Holbrook
(74) *Attorney, Agent, or Firm* — Dekel Patent Ltd.; David Klein (57) ABSTRACT

A Scotch yoke actuator includes a housing formed with four piston bores spaced equally 90° from each other, a shaft with four yokes, each of the yokes having a slot, and four pistons including two pairs of 180° opposing pistons, one pair of the opposing pistons being orthogonal to the other pair of the opposing pistons. Each of the pistons is arranged for linear motion in one of the piston bores. Each of the pistons includes a piston rod which includes a piston pin which is slidable in the slot. Linear motion of the pistons in the piston bores causes rotation of the shaft.

9 Claims, 12 Drawing Sheets

(56) References Cited

U.S. PATENT DOCUMENTS

2012/0272758 A1\* 11/2012 Diggs .................... F02B 75/227
                                                                74/50
2015/0059681 A1\*  3/2015 Stuart ....................... F01B 7/00
                                                                123/18 R
2017/0314584 A1\* 11/2017 Holtgraver .......... F15B 15/1409

FOREIGN PATENT DOCUMENTS

| DE | 4342921 C1 | \* | 5/1995 | .............. B21J 13/04 |
| EP | 3329164 | | 6/2018 | |
| GB | 2535173 A | \* | 8/2016 | .......... F15B 15/1447 |
| SE | 461928 B | \* | 4/1990 | ............ F15B 15/066 |

\* cited by examiner

FOUR PISTON SCOTCH YOKE ACTUATOR

FIELD OF THE INVENTION

The present invention generally relates to systems for conversion between linear and rotary motion, and particularly to a four piston Scotch yoke actuator.

BACKGROUND OF THE INVENTION

A common mechanism for converting linear motion to quarter-turn rotary motion is the Scotch yoke actuator. In a typical Scotch yoke design, a linearly reciprocating push rod is coupled to the shaft by a lever arm or yoke that converts the linear movement of the rod to a rotary movement of the shaft, with a maximum rotation angle of 90°. The push rod is coupled to the yoke by a yoke pin that passes through a hole in the push rod and a slot in the yoke, thereby allowing the yoke pin to slide along the slot in the yoke as the push rod moves and the yoke and shaft rotate.

Scotch yoke actuators are used, among other things, for operating valves in many industries. As is known in the art, a Scotch yoke actuator can be a double acting (DA) actuator in which fluid pressure moves the piston in both directions, or a spring return (SR) actuator in which fluid pressure moves the piston in one direction and a spring moves the piston in the opposite direction.

Figure 1:
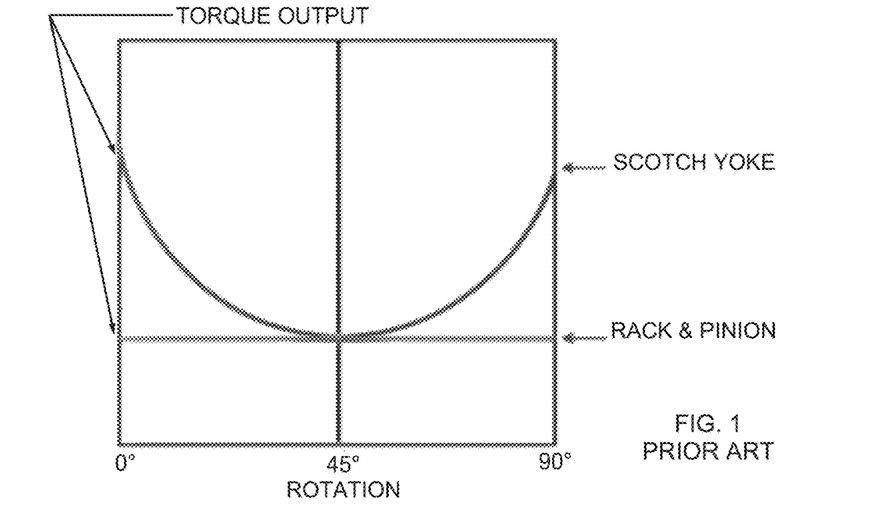
FIG. 1 is a prior art graphical illustration of torque output over 90° of a DA Scotch yoke actuator and a rack-and-pinion actuator.

Rack-and-pinion actuators are also used for operating these valves. FIG. 1 shows the torque output for a DA Scotch actuator versus a rack-and-pinion actuator. The Scotch yoke actuator provides a rotation of 90° with a torque that is higher at the ends of travel and lower in the middle; in contrast, the rack-and-pinion actuator has a basically constant torque throughout the 90° rotation. Thus, the Scotch yoke actuator has an advantage over the rack-and-pinion actuator for operating valves that have higher torque requirements at the fully closed position. The SR Scotch yoke actuator has a torque advantage over the rack-and-pinion actuator, too, but a different one.

A significant disadvantage of the Scotch yoke design is that there are side loading effects on the moving parts, which can limit the usefulness of the Scotch yoke actuator.

SUMMARY OF THE INVENTION

The present invention seeks to provide a novel a four piston Scotch yoke actuator, as is described more in detail below.

Figure 3A:
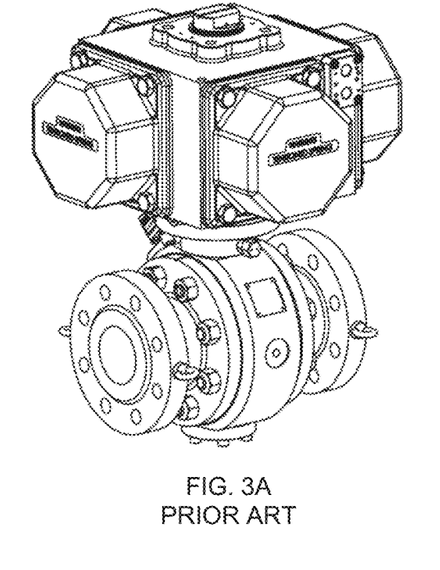
FIG. 3A is an illustration of a four-piston rack-and-pinion actuator of the prior art.

The Scotch yoke actuator of the present invention can be built in compact dimensions and yet provide significantly higher torque than rack-and-pinion actuators of approximately the same size. As is known, the torque which can be achieved with an actuator depends on the air pressures used and on the piston position, and for spring-return actuators, also on the type and configuration of springs used in the actuator. For example, FIG. 3A illustrates a rack-and-pinion actuator of the prior art, commercially available as COMPACT from Habonim Ltd., Israel. The COMPACT actuator is a quarter-turn rack-and-pinion pneumatic actuator that employs a four-piston design based on U.S. Pat. No. 4,370,917 to Alan Bunyard. The maximum torque output of the COMPACT actuator is about 1359 Nm with the piston at the spring end and for a particular spring configuration. FIG. 3C illustrates a prior art single-piston Scotch yoke actuator. Its maximum torque output is about 2700 Nm, but as seen in FIG. 3C, it is significantly larger in size than the COMPACT actuator.

Figure 3B:
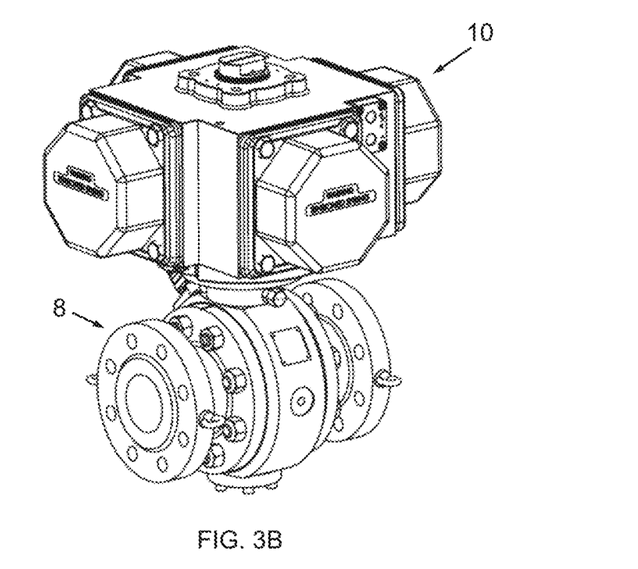
FIG. 3B is an illustration of the four-piston Scotch yoke actuator of the invention.
Figure 3C:
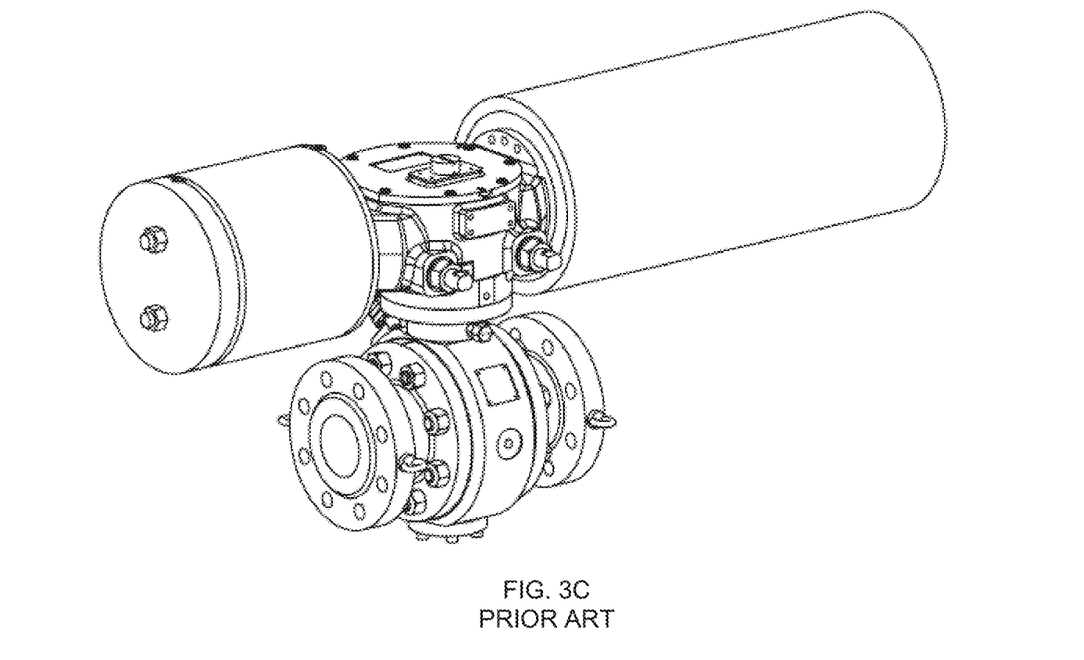
FIG. 3C is an illustration of a prior art single-piston Scotch yoke actuator.

In contrast, FIG. 3B illustrates a four piston Scotch yoke actuator 10 coupled to a valve 8, in accordance with an embodiment of the present invention. The Scotch yoke actuator 10 has a maximum torque output of about 2700 Nm with the piston at the spring end and for a particular spring configuration, and yet is approximately the same size as the COMPACT actuator. Thus, the present invention surprisingly almost doubles the torque of a quarter-turn rack-and-pinion pneumatic actuator, without any increase in size, and has the same output as a single-piston Scotch yoke actuator of the prior art, and yet is less than half the length of the prior art single-piston Scotch yoke actuator. The present invention thus provides significant advantages in torque-to-size ratio.

The actuator of the invention is not limited in size and output torque. For example, without limitation, the torque achievable with the invention may be from 1000 to hundreds of thousands Newton-meters.

There is provided in accordance with a non-limiting embodiment of the present invention, a Scotch yoke actuator including a housing formed with four piston bores spaced equally 90° from each other, a shaft with four yokes, each of the yokes having a slot, and four pistons including two pairs of 180° opposing pistons, one pair of the opposing pistons being orthogonal to the other pair of the opposing pistons, each of the pistons arranged for linear motion in one of the piston bores, wherein each of the pistons includes a piston rod which includes a piston pin which is slidable in the slot, wherein linear motion of the pistons in the piston bores causes rotation of the shaft.

In accordance with a non-limiting embodiment of the present invention each of the piston rods is supported on one side thereof by one or more piston rod support members and on an opposite side thereof by one or more piston rod supports.

In accordance with a non-limiting embodiment of the present invention the one or more piston rod supports are formed on the shaft.

In accordance with a non-limiting embodiment of the present invention each of the pistons includes a peripheral guide ring arranged to slide in each of the piston bores.

In accordance with a non-limiting embodiment of the present invention each of the piston pins includes an inner pin located in an outer sleeve.

In accordance with a non-limiting embodiment of the present invention the outer sleeve is harder than the inner pin.

In accordance with a non-limiting embodiment of the present invention each of the piston rods includes two legs coupled to the piston, which are connected by a cross member, and two lugs to which the piston pin is coupled.

In accordance with a non-limiting embodiment of the present invention each of the pistons is fluidly actuated to move against a biasing device located in each of the piston bores. This is a spring return design. The invention can also be carried out as a double acting actuator.

In accordance with a non-limiting embodiment of the present invention a base of the actuator includes a valve interface member and regulating stop screws coupled to the valve interface member.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 2:
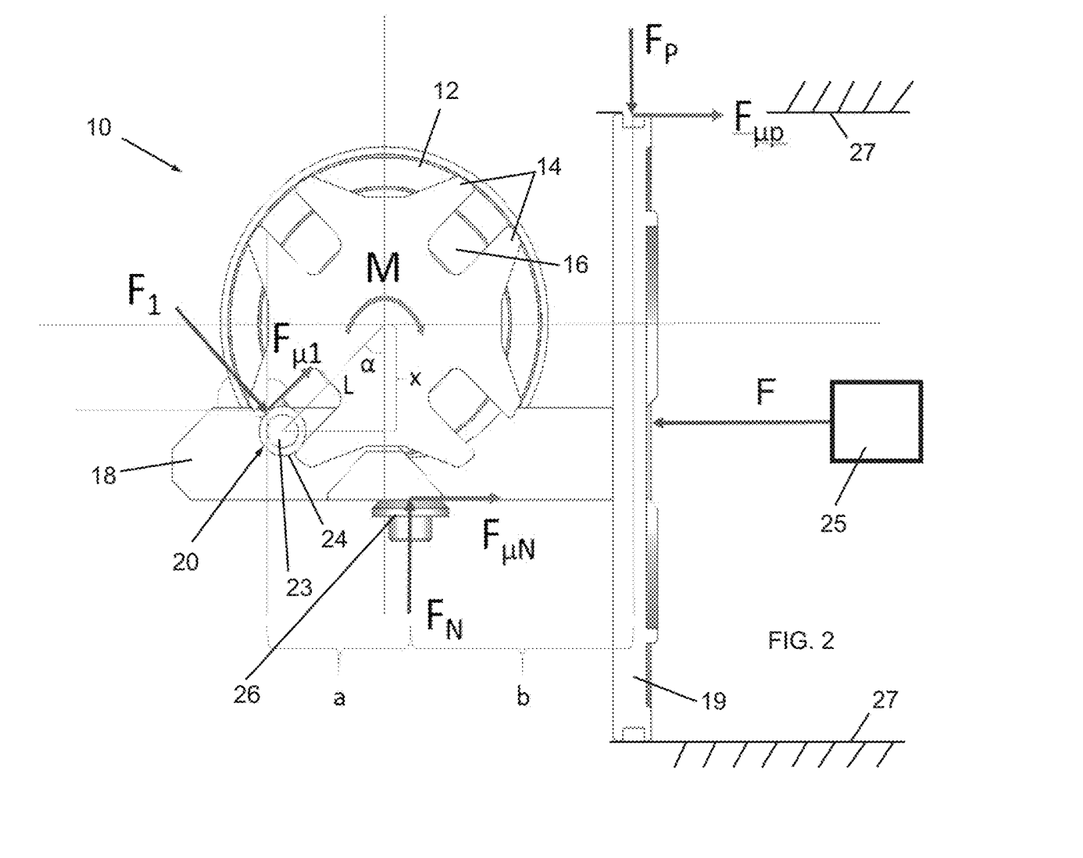
FIG. 2 is a force diagram of forces applied to the Scotch yoke actuator of the invention.

Reference is now made to FIG. 2, which is a force diagram of forces applied to the Scotch yoke actuator 10 of the invention.

The Scotch yoke actuator 10 includes a shaft (also called actuator shaft) 12 with four yokes 14. Each yoke 14 has a slot 16. Each of the four yokes 14 is coupled to a piston rod 18 of a piston 19 by means of a piston pin 20, also referred to as piston roller 20 or piston bearing shaft 20. The piston pin 20 may be constructed of an inner pin 23 located in an outer sleeve 24. The inner pin 23 and the outer sleeve 24 may be constructed of a steel alloy (the same or different alloy), with the inner pin 23 hardened and heat-treated to have no significant brittleness, and with a hardness less than that of the outer sleeve 24. The extra hardness of outer sleeve 24 may be useful in minimizing wear on piston pin 20 when the pin slides in slot 16. The inner pin 23 and the outer sleeve 24 may be constructed of different metals or materials.

The slot 16 may undergo nitride case hardening to provide a superior, smooth bearing surface with little friction and enhanced wear resistance for the piston pin 20 movement. Alternatively, the slot 16 could be coated with different coatings, such as but not limited to, nickel, chrome, or a hard metal.

The shaft 12, yoke 14, piston rod 18 and piston 19 may be made, without limitation, of a steel alloy or other suitable materials.

The piston rod 18 is supported by one or more piston rod support members 26, which are described further below. The piston 19 reciprocates linearly in a piston bore 27.

The piston rod 18, the piston pin 20 and the yoke 14 are subject to significant forces as shown in the force diagram of FIG. 2. A force F is applied to the face of piston 19 by a force actuator 25, such as a fluid (that is, pneumatic or hydraulic) actuator for a double acting actuator or a biasing device (e.g., spring) for a spring return actuator. The yoke 14 applies a force $F_1$ on piston pin 20, which is normal to the inner face of slot 16 and is directed to the center of piston pin 20. The force $F_1$ creates a friction force $F_{\mu I}$ normal to force $F_1$. The piston rod support member 26 must provide a supportive counterforce $F_N$ as a reaction to the side force on the piston rod 18; the force $F_N$ creates a friction force $F_{\mu N}$ normal to force $F_N$. The piston 19 is subject to a radial force $F_P$ which is the supportive counterforce from the wall of the piston bore 27. The radial force $F_P$ creates a friction force $F_{\mu P}$ normal to force $F_P$.

The angle α is the turning angle of the centerline of slot 16 with respect to the vertical. The vertical component of the distance from the center of shaft 12 to the center of the piston pin 20 is designated x.

Figure 4:
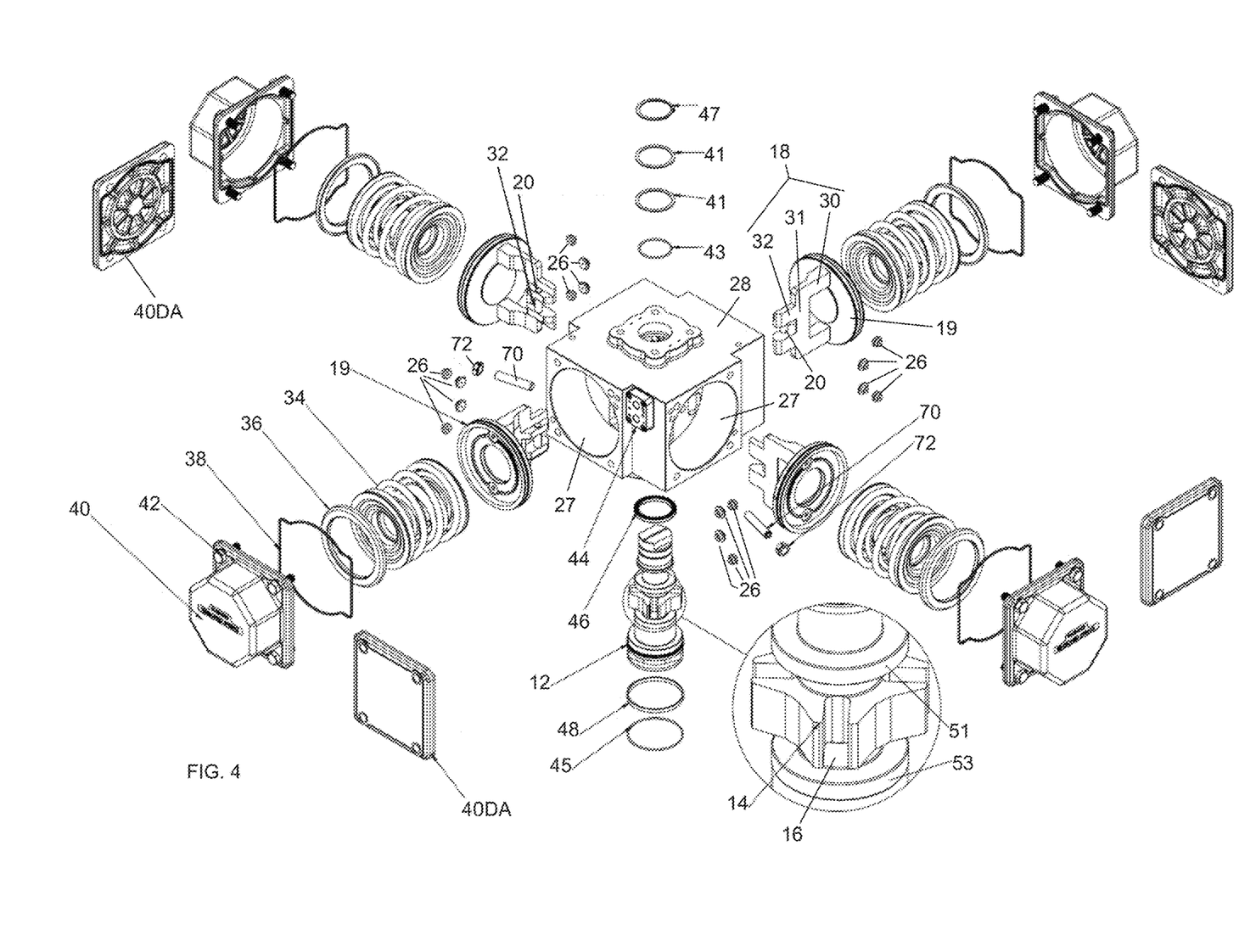
FIG. 4 is a simplified exploded illustration of a Scotch yoke actuator, constructed and operative in accordance with a non-limiting embodiment of the invention.
Figure 5A:
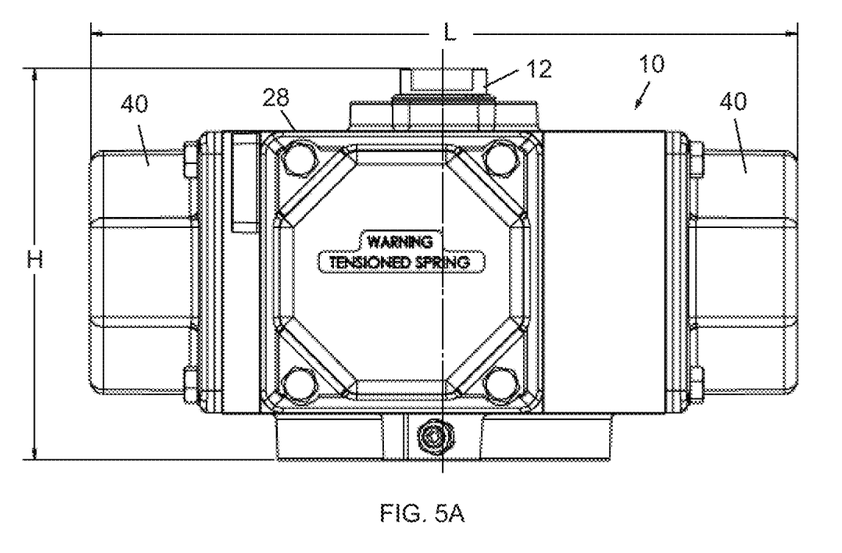
FIGS. 5A, 5B, 5C and 5D are simplified side-view, front-view, top-view and perspective view illustrations, respectively, of the Scotch yoke actuator.
Figure 5B:
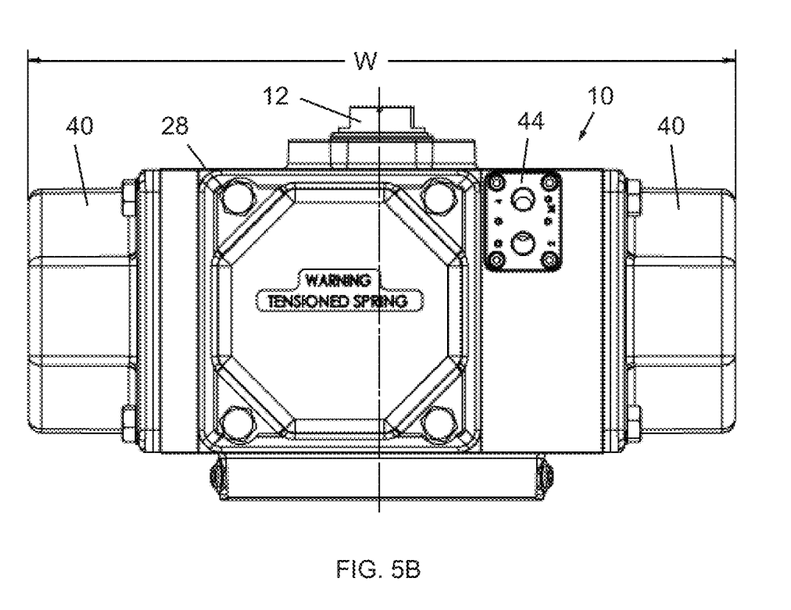
Figure 5C:
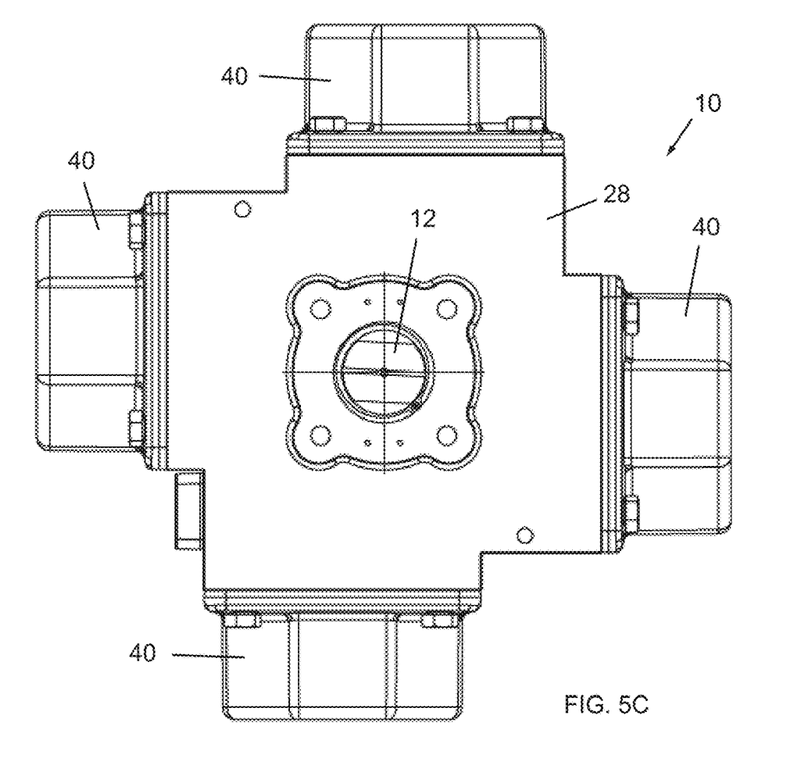
Figure 5D:
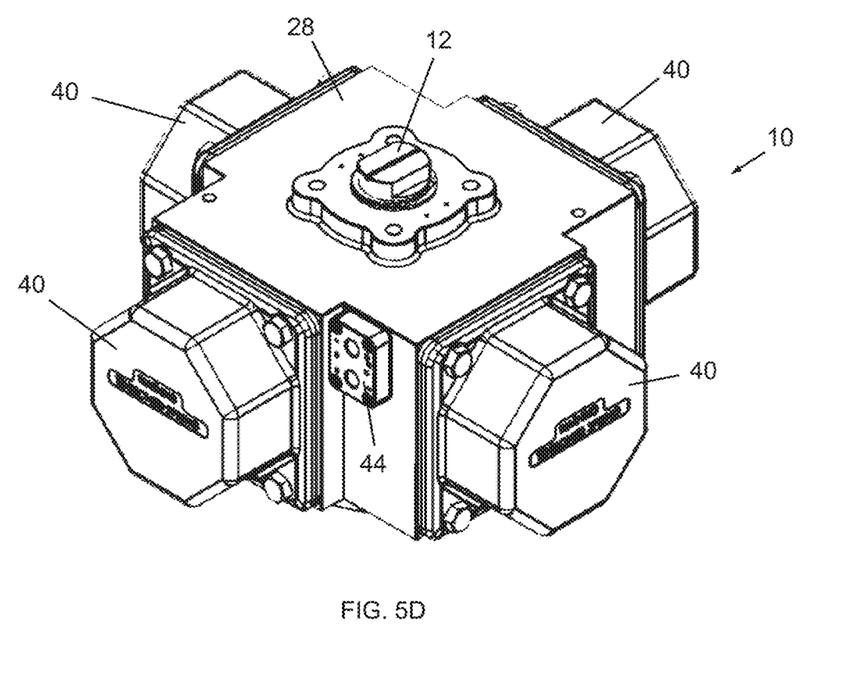

Reference is now made to FIG. 4, which illustrates the components of Scotch yoke actuator 10, in accordance with a non-limiting embodiment of the invention.

The actuator 10 includes a housing 28 formed with four piston bores 27 spaced equally 90° from each other. There are four pistons 19: two pairs of 180° opposing pistons, one pair of opposing pistons being orthogonal(90°) to the other pair of opposing pistons. The piston rod 18 may include two legs 30 coupled to piston 19, which are connected by a cross member 31. The piston rod 18 may further include two lugs 32 to which piston pin 20 is coupled. For example, without limitation, ends of piston pin 20 may be received in apertures formed in lugs 32 and one end of the piston pin 20 maybe secured by circlips. The face of piston 19 may be biased by a biasing device 34, such as a spring set for a spring return unit or a fluid force for a double acting unit, as is well known in the art. The other side of biasing 34 may be assembled against a support ring 36, which is sealed by a cover seal 38 against a cover 40, which is secured to housing 28 by cover bolts 42. As mentioned above, the invention can also be carried out as a double acting actuator, which would use a different cover 40DA, and not have the spring set of the SR version.

As is well known in the art, for pneumatic actuation, an air port block 44 coupled to housing 28, provides the pneumatic forces on the faces of the pistons 19 via passageways in the housing and via the cover 40 for each piston 19. The invention can be carried out for hydraulic actuation, too.

The shaft 12 is journaled in housing 28, such as by means of upper and lower bearings 46 and 48, respectively. The shaft 12 may be sealed by upper and lower seals 43 and 45, respectively. The upper end of shaft 12 may be secured by one or more spacers 41 and a circlip 47.

The shaft 12 may include upper and lower peripheral side load support surfaces 51 and 53, respectively, which support radial side loads imposed on the piston rod 18. Portions of the piston rod 18, which slide against upper and lower peripheral side load support surfaces 51 and 53 (also referred to as upper and lower piston rod supports 51 and 53), serve as rolling bearing surfaces for the piston rod 18.

Reference is now made to FIGS. 5A, 5B, 5C and 5D, which illustrate the external design of the Scotch yoke actuator 10, in accordance with a non-limiting embodiment of the invention. Without limitation, the length L and width W of the actuator may be 639.5 mm, and the height H may be 355 mm. (In FIGS. 6A and 6C, the exemplary, non-limiting distance G from the section line to the bottom of the actuator may be 250 mm.) The invention is not limited to these dimensions in any way. However, these dimensions are written here to highlight one of the surprising achievements of the invention of overcoming engineering challenges to produce the four piston Scotch yoke actuator in such small dimensions with such great torque capability.

Figure 6A:
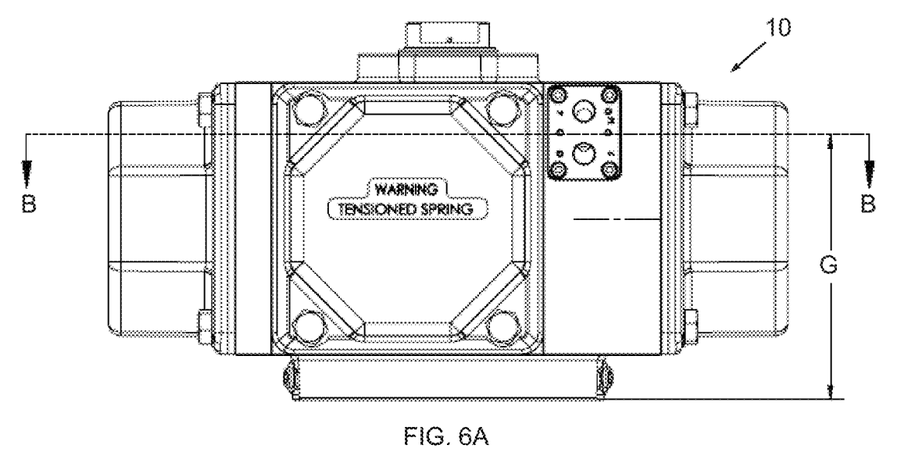
FIGS. 6A and 6B are simplified front-view and upper horizontal sectional illustrations, respectively, of the Scotch yoke actuator showing upper piston rod supports (there are identical lower piston rod supports, too), with FIG. 6B taken along lines B-B in FIG. 6A, with the pistons in the fully open position.
Figure 6B:
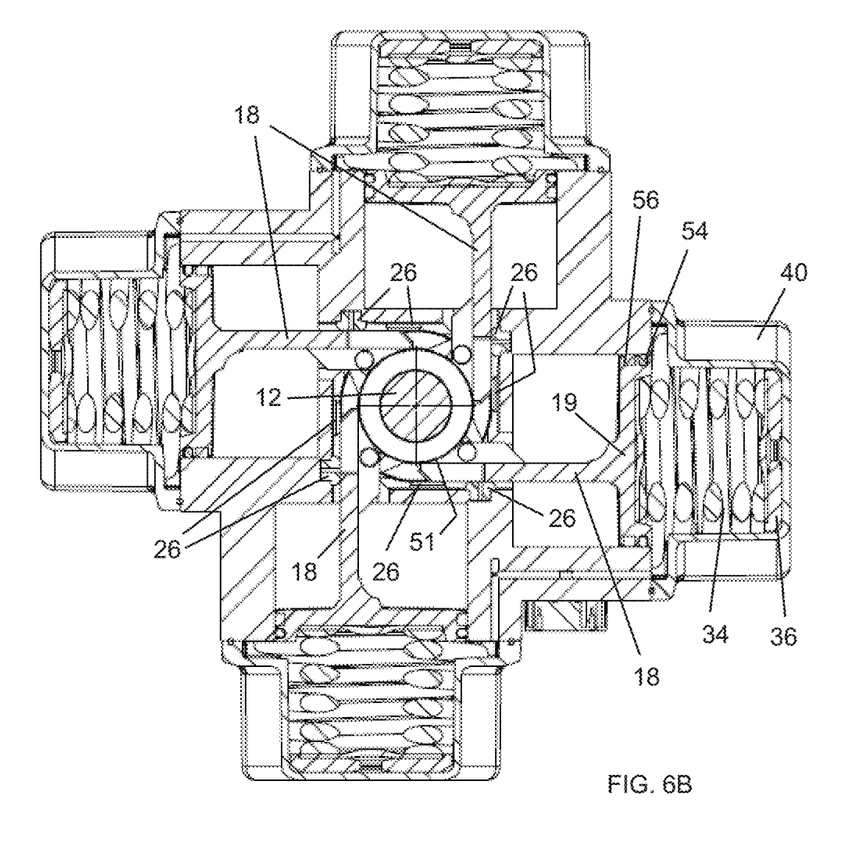

Reference is now made to FIGS. 6A and 6B. It is seen that the piston rod 18 is supported in its reciprocating motion on one side by the upper piston rod support 51 and the opposite side of piston rod 18 is supported in its reciprocating motion by the piston rod support members 26. It is noted that the figures here do not show the identical lower piston rod supports 53 and the other set of piston rod support members 26; thus, in the non-limiting illustrated embodiment, there are a total of four piston rod support members 26. FIGS. 6A and 6B show the pistons 19 in the fully open position. The piston rod support members 26 may be made of without limitation, polyoxymethylene (DELRIN), polytetrafluoro-ethylene, polyether ether ketone (PEEK), or other suitable engineering polymers or metals. PEEK may be preferred for bearing the forces in the dimensions of the unit of FIGS. 5A-5D.

Figure 6C:
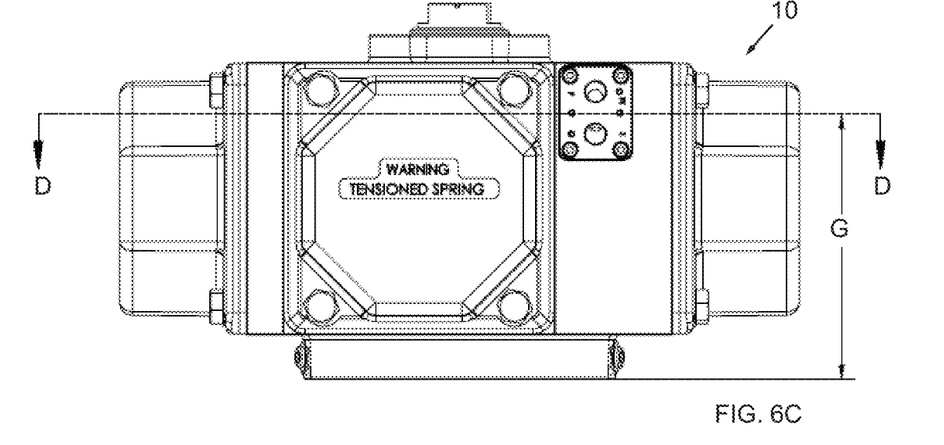
FIGS. 6C and 6D are simplified front-view and upper horizontal sectional illustrations, respectively, of the Scotch yoke actuator showing upper piston rod supports (there are identical lower piston rod supports, too), with FIG. 6D taken along lines D-D in FIG. 6C, with the pistons in the fully closed position.
Figure 6D:
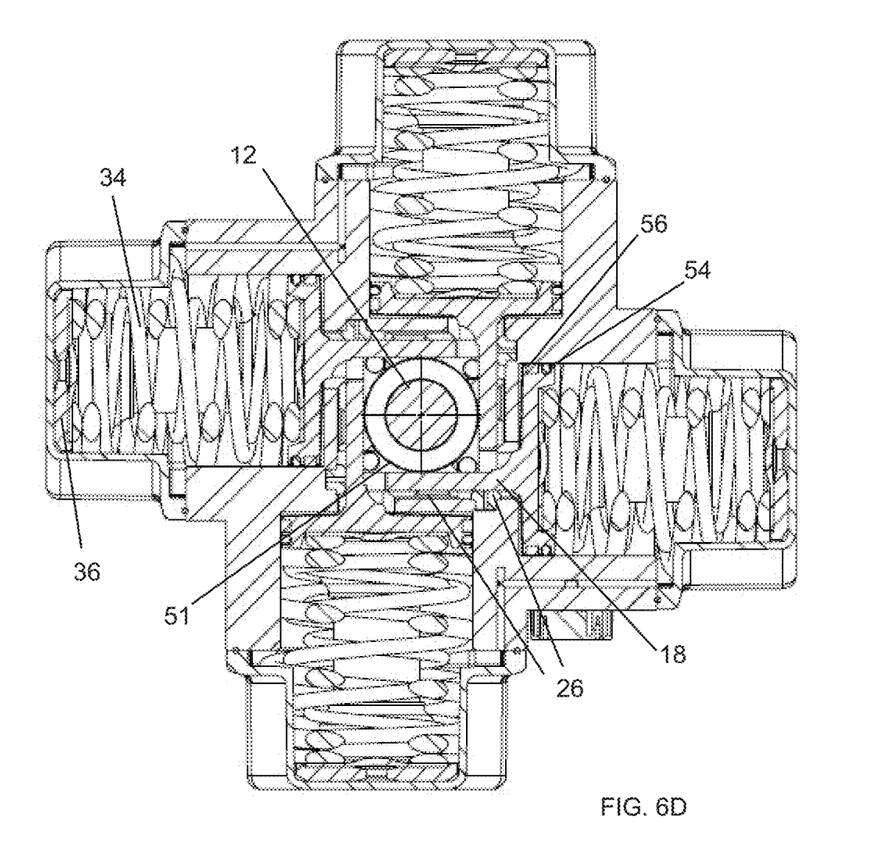

FIGS. 6C and 6D show the pistons 19 in the fully closed position.

Figure 7:
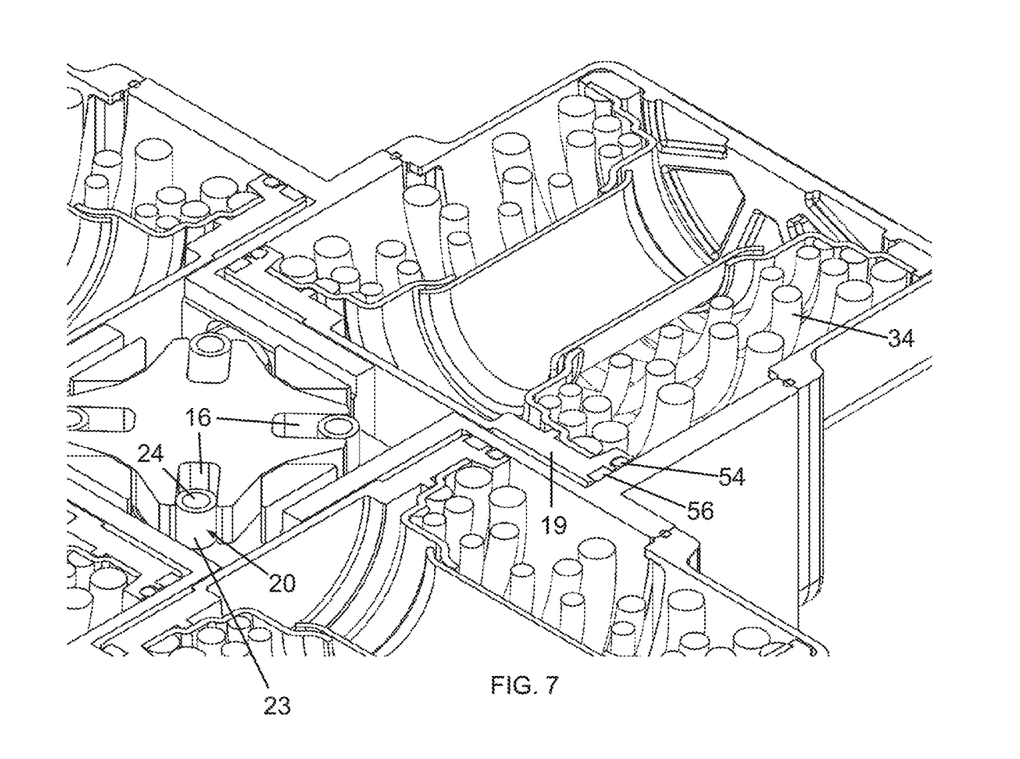
FIG. 7 is a partially cutaway illustration of yoke supports for the reciprocating piston yokes.

Reference is now made additionally to FIG. 7. Each piston 19 may include an O-ring 54 which peripherally seals piston 19 in its reciprocating motion to prevent escape of the pressurized air that provides the force against the piston and to prevent entry of debris. The O-ring 54 is meant to provide sliding sealing; it is not designed to withstand the side (radial) forces on the piston head. Accordingly, each piston 19 may include a peripheral guide ring 56, which may be made of, without limitation, DELRIN, polytetrafluoroethylene, PEEK, or other suitable engineering polymers or metals. The guide ring 56 preferably has a flat peripheral surface, unlike O-ring 54, which has a round peripheral surface. The flat peripheral surface provides a sufficiently wide surface to bear the radial forces (side forces) that are imposed on the piston head, and enables the piston 19 to slide with very little friction in the piston bore 27 (FIGS. 2 and 4). Optionally, the piston bore 27 may undergo anod-izing or other treatments, or may be coated with different materials to enhance wear resistance and reduce friction.

Figure 8A:
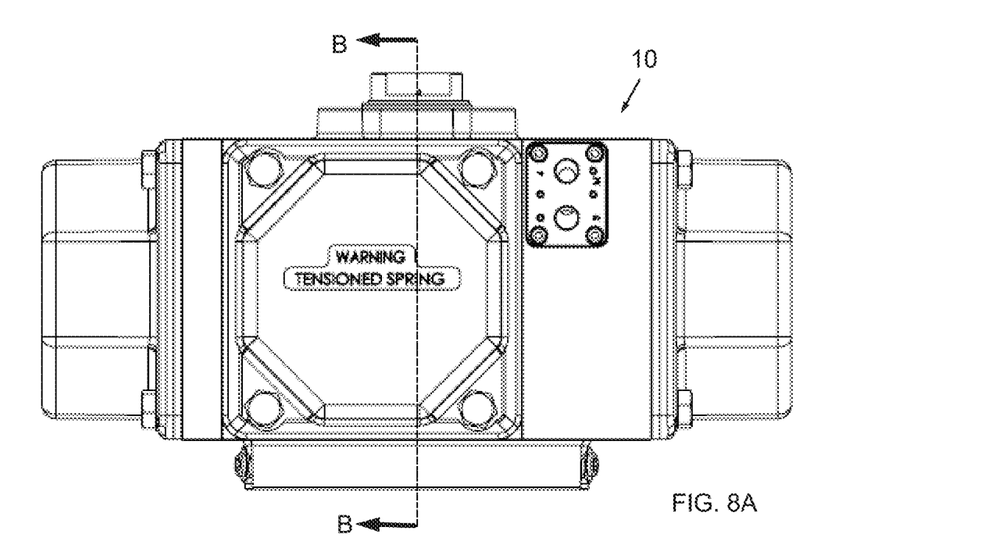
FIGS. 8A and 8B are simplified front-view and mid-vertical sectional illustrations, respectively, of the Scotch yoke actuator, with FIG. 8B taken along lines B-B in FIG. 8A, with the pistons in the fully open position.
Figure 8B:
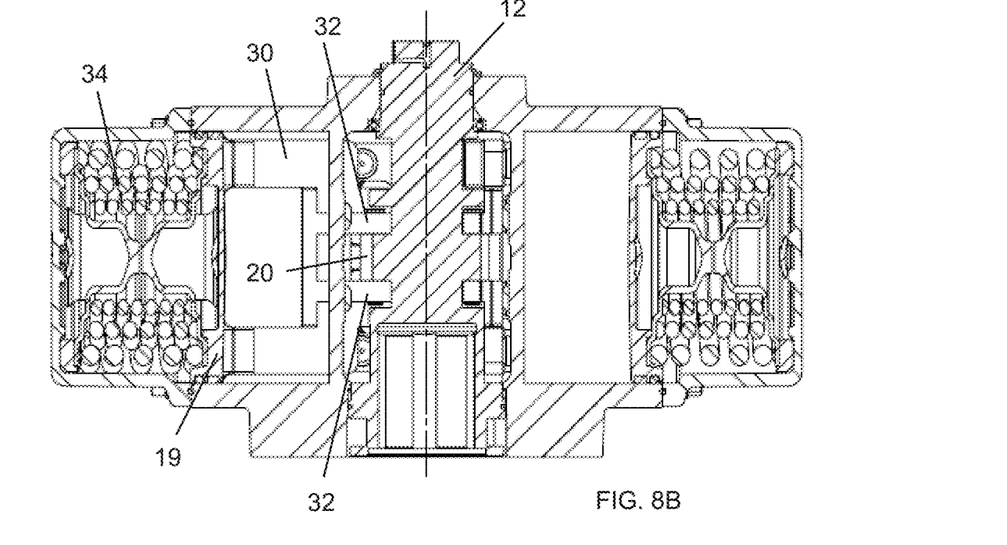
Figure 8C:
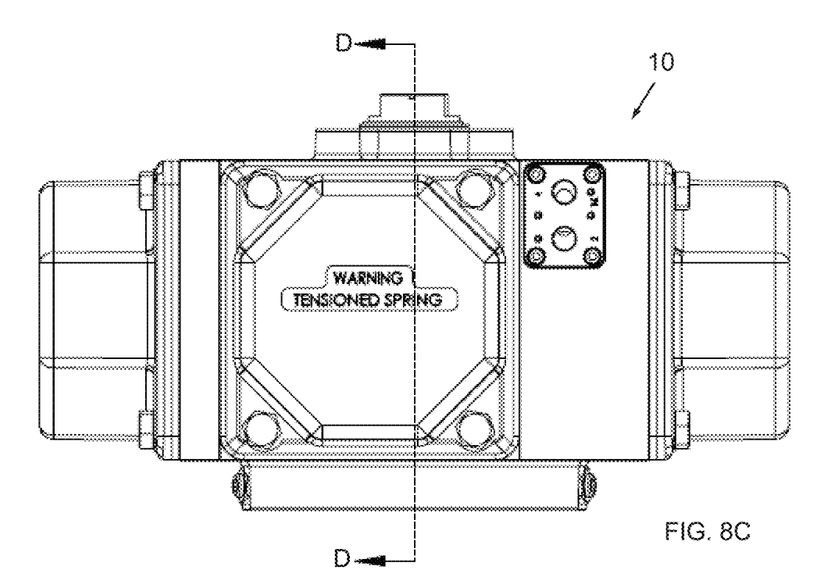
FIGS. 8C and 8D are simplified front-view and mid-vertical sectional illustrations, respectively, of the Scotch yoke actuator, with FIG. 8D taken along lines D-D in FIG. 8C, with the pistons in the fully closed position.
Figure 8D:
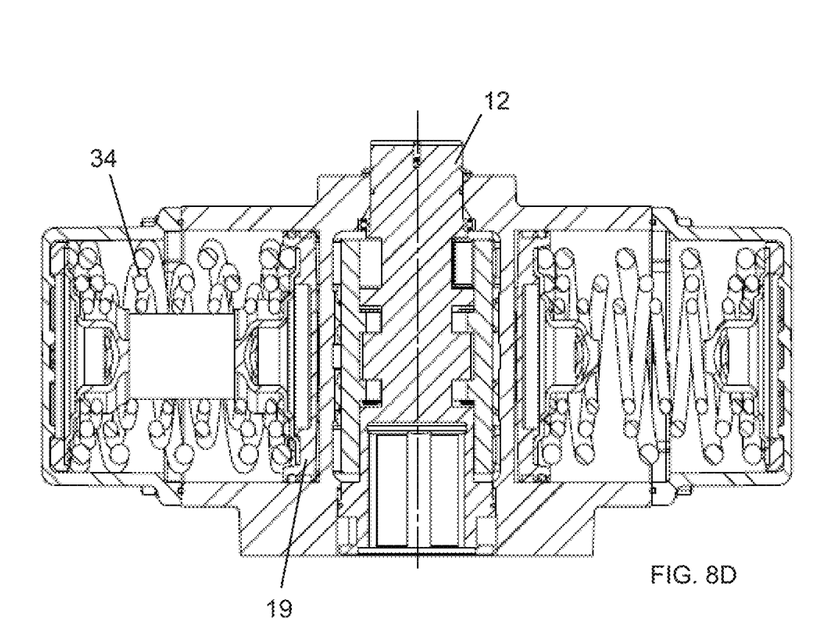

FIGS. 8A and 8B illustrate the Scotch yoke actuator 10 with the pistons in the fully open position. FIGS. 8C and 8D illustrate the Scotch yoke actuator 10 with the pistons in the fully closed position.

Reference is now made to FIGS. 9A-9D, which illustrate another feature of the Scotch yoke actuator 10. A base 62 of the actuator 10 may be provided with a valve interface member 64 (FIG. 9B), which can be coupled to a variety of valves. (In FIGS. 9A and 9C, the exemplary, non-limiting distance J from the section line to the bottom of the actuator may be 21 mm.) For example, the valve interface member 64 may be, without limitation, a 72 mm ISO 5211 key driven interface member, which may provide up to 8000 Nm torque. Alternatively, an insert (not shown) may be provided to fit in interface member 64, which is a 50 mm diameter key driven insert or a 46 mm square drive insert for up to 4000 Nm torque. Different sets of mounting holes 66 or 68 may be provided to cover different mounting configurations.

Figure 9A:
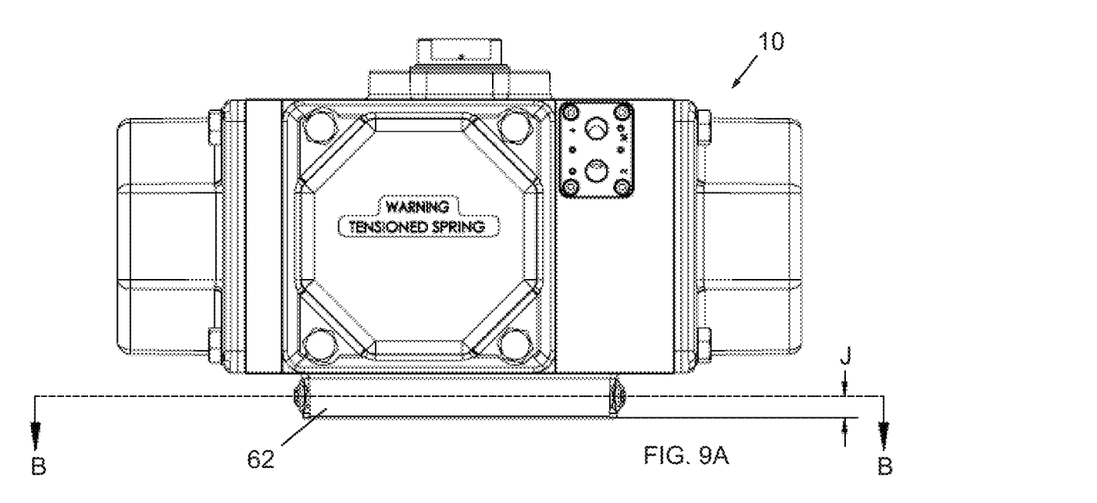
FIGS. 9A and 9B are simplified front-view and lower horizontal sectional illustrations, respectively, of the Scotch yoke actuator, with FIG. 9B taken along lines B-B in FIG. 9A, with regulating stop screws shown with the Scotch yoke actuator shaft in the fully open position.
Figure 9B:
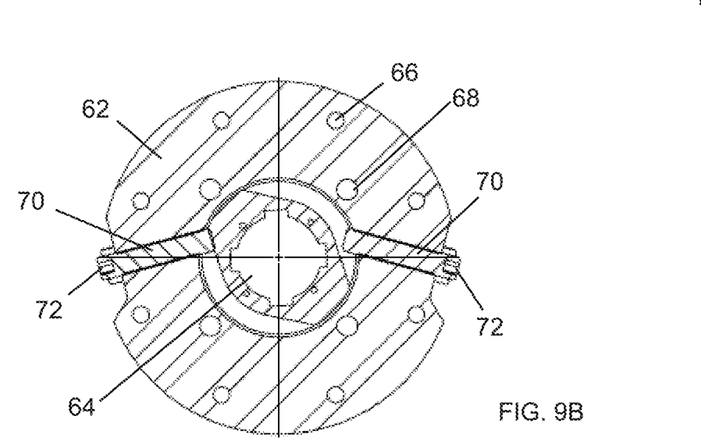
Figure 9C:
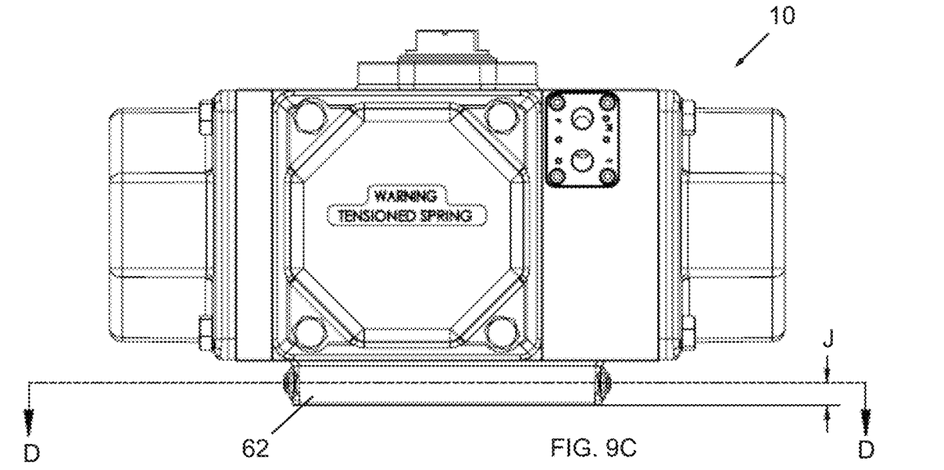
FIGS. 9C and 9D are simplified front-view and lower horizontal sectional illustrations, respectively, of the Scotch yoke actuator, with FIG. 9D taken along lines D-D in FIG. 9C, with regulating stop screws shown with the Scotch yoke actuator shaft in the fully closed position.
Figure 9D:
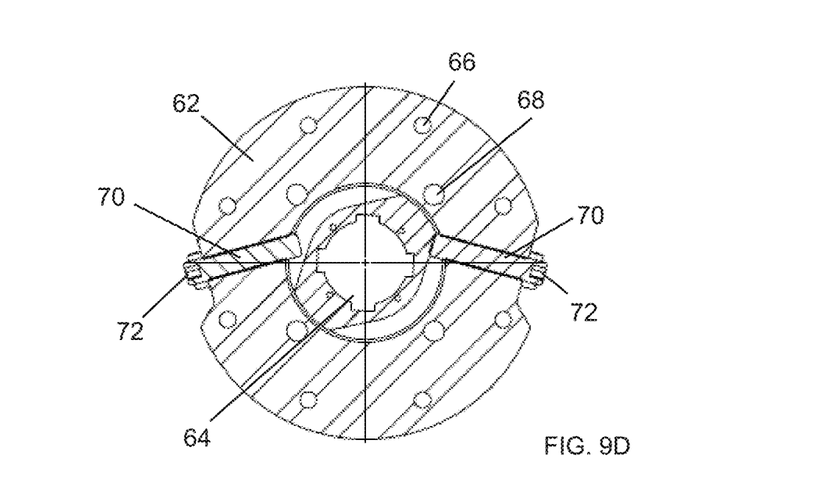

Regulating stop screws 70 with locking nuts 72 may be provided to allow rotational adjustment (without limitation, ±3°) of the valve interface member 64 so that it is aligned with the valve so that the actuator properly reaches the 0° and 90° closed and open positions of the valve. FIGS. 9A and 9B illustrate the regulating stop screws 70 in the fully open position. FIGS. 9C and 9D illustrate the regulating stop screws 70 in the fully closed position.

What is claimed is:

1. A Scotch yoke actuator comprising:
 a housing formed with four piston bores spaced equally 90° from each other;
 a shaft with four yokes, each of said yokes having a slot; and
 four pistons comprising two pairs of 180° opposing pistons, one pair of the opposing pistons being orthogonal to the other pair of the opposing pistons, each of said pistons arranged for linear motion in one of said piston bores, wherein each of said pistons comprises a piston rod which comprises a piston pin which is slidable in said slot, wherein linear motion of said pistons in said piston bores causes rotation of said shaft;
 and wherein peripheral side load support surfaces are formed on said shaft on opposite sides of said yokes, wherein one side of each of said piston rods is supported during reciprocating motion thereof by said peripheral side load support surfaces, and an opposite side of each of said piston rods is supported in its reciprocating motion by piston rod support members which are secured to said housing and located opposite said peripheral side load support surfaces.

2. The Scotch yoke actuator according to claim 1, wherein said peripheral side load support surfaces protrude radially outwards from said shaft.

3. The Scotch yoke actuator according to claim 1, wherein said piston rod support members are made of an engineering polymer.

4. The Scotch yoke actuator according to claim 1, wherein each of said pistons comprises a peripheral guide ring arranged to slide in each of said piston bores.

5. The Scotch yoke actuator according to claim 1, wherein each of said piston pins comprises an inner pin located in an outer sleeve.

6. The Scotch yoke actuator according to claim 5, wherein said outer sleeve is harder than said inner pin.

7. The Scotch yoke actuator according to claim 1, wherein each of said piston rods comprises two legs coupled to said piston, which are connected by a cross member, and two lugs to which said piston pin is coupled.

8. The Scotch yoke actuator according to claim 1, wherein a force actuator is arranged to apply a fluid force to a face of said piston.

9. The Scotch yoke actuator according to claim 1, wherein a biasing device is arranged to apply a force to a face of said piston.

* * * * *